(12) United States Patent
Uesugi et al.

(10) Patent No.: US 12,432,453 B2
(45) Date of Patent: Sep. 30, 2025

(54) IMAGE STABILIZATION CONTROL APPARATUS AND METHOD

(71) Applicant: CANON KABUSHIKI KAISHA, Tokyo (JP)

(72) Inventors: Tomomi Uesugi, Kanagawa (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 692 days.

(21) Appl. No.: 17/887,707

(22) Filed: Aug. 15, 2022

(65) Prior Publication Data
US 2023/0068428 A1 Mar. 2, 2023

(30) Foreign Application Priority Data
Aug. 27, 2021 (JP) .................... 2021-139231

(51) Int. Cl.
*H04N 23/68* (2023.01)
*G03B 5/08* (2021.01)
*H04N 23/73* (2023.01)

(52) U.S. Cl.
CPC ............ *H04N 23/687* (2023.01); *G03B 5/08* (2013.01); *H04N 23/6811* (2023.01); *H04N 23/6812* (2023.01)

(58) Field of Classification Search
CPC ............ H04N 23/687; H04N 23/6811; H04N 23/6812; H04N 23/73; G03B 5/08
See application file for complete search history.

(56) References Cited

U.S. PATENT DOCUMENTS

| 8,830,336 B2 * | 9/2014 | Wakamatsu | H04N 23/6812 348/208.7 |
| 8,964,046 B2 * | 2/2015 | Tsuchiya | H04N 23/6812 348/208.7 |
| 11,233,942 B2 * | 1/2022 | Uesugi | H04N 23/6811 |

FOREIGN PATENT DOCUMENTS

| JP | 2012088466 A | 5/2012 |
| JP | 2020-160162 A | 10/2020 |

OTHER PUBLICATIONS

The above foreign patent document was cited in the Jul. 11, 2025 Japanese Office Action, without an English Translation, that issued in Japanese Patent Application No. 2021-139231.

* cited by examiner

Primary Examiner — Ahmed A Berhan
(74) Attorney, Agent, or Firm — Cowan, Liebowitz & Latman, P.C.

(57) ABSTRACT

An image stabilization control apparatus comprises: a first calculation unit that calculates a first shake reduction target value for reducing translational shake in a first direction using a first signal indicating translational shake in the first direction and a second signal indicating rotational shake about an axis in a second direction; a second calculation unit that calculates a second shake reduction target value for reducing the translational shake in the first direction using the first signal and a third signal indicating rotational shake about an axis in a third direction; and a selection unit that selects one of a plurality of shake reduction target values, including at least the first and second shake reduction target values, for reducing the translational shake in the first direction based on the second and third signals.

16 Claims, 11 Drawing Sheets

IMAGE STABILIZATION CONTROL APPARATUS AND METHOD

BACKGROUND OF THE INVENTION

Field of the Invention

The present invention relates to an image stabilization control apparatus and method, and particularly to a technique for reducing translational blur.

Description of the Related Art

Conventionally, various methods for reducing image blur due to camera shake and the like have been proposed. In particular, in recent years, improvements in the performance of angular velocity sensors have made it possible to detect angular velocity in a wider frequency band than before. By utilizing this, the correction performance with respect to the angular shake of the camera has been improved, and it has become possible to perform image shooting with a slower shutter speed than before. On the other hand, in shooting with a slow shutter speed, the effect of translational shake, which has not been considered as a problem, has become noticeable in some cases.

Japanese Patent Laid-Open No. 2020-160162 discloses a method for reducing image deterioration due to translational blur by performing highly accurate image stabilization by performing correction in consideration of the dominant frequency band for each detection axis of translational shake.

In Japanese Patent Laid-Open No. 2020-160162, on the premise that high-frequency shake is the dominant factor for translational shake in rotational motion around the y-axis, and low-frequency shake is the dominant factor for translational shake in rotational motion around the z-axis, image stabilization for translational shake in the x-axis direction is performed. However, this premise may not always be met.

SUMMARY OF THE INVENTION

The present invention has been made in consideration of the above situation, and performs highly accurate translational image stabilization with a simple configuration.

According to the present invention, provided is an image stabilization control apparatus comprising one or more processors and/or circuitry which functions as: a first calculation unit that calculates a first shake reduction target value for reducing translational shake in a first direction using a first signal indicating translational shake in the first direction and a second signal indicating rotational shake about an axis in a second direction which is orthogonal to the first direction; a second calculation unit that calculates a second shake reduction target value for reducing the translational shake in the first direction using the first signal and a third signal indicating rotational shake about an axis in a third direction which is orthogonal to the first direction and the second direction; and a selection unit that selects one of a plurality of shake reduction target values, including at least the first shake reduction target value and the second shake reduction target value, for reducing the translational shake in the first direction based on the second signal and the third signal.

Further, according to the present invention, provided is an image stabilization control method comprising: calculating a first shake reduction target value for reducing translational shake in a first direction using a first signal indicating translational shake in the first direction and a second signal indicating rotational shake about an axis in a second direction which is orthogonal to the first direction; calculating a second shake reduction target value for reducing the translational shake in the first direction using the first signal and a third signal indicating rotational shake about an axis in a third direction which is orthogonal to the first direction and the second direction; and selecting one of a plurality of shake reduction target values, including at least the first shake reduction target value and the second shake reduction target value, for reducing the translational shake in the first direction based on the second signal and the third signal.

Furthermore, according to the present invention, provided is a non-transitory computer-readable storage medium, the storage medium storing a program that is executable by the computer, wherein the program includes program code for causing the computer to function as an image stabilization control apparatus comprising: a first calculation unit that calculates a first shake reduction target value for reducing translational shake in a first direction using a first signal indicating translational shake in the first direction and a second signal indicating rotational shake about an axis in a second direction which is orthogonal to the first direction; a second calculation unit that calculates a second shake reduction target value for reducing the translational shake in the first direction using the first signal and a third signal indicating rotational shake about an axis in a third direction which is orthogonal to the first direction and the second direction; and a selection unit that selects one of a plurality of shake reduction target values, including at least the first shake reduction target value and the second shake reduction target value, for reducing the translational shake in the first direction based on the second signal and the third signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
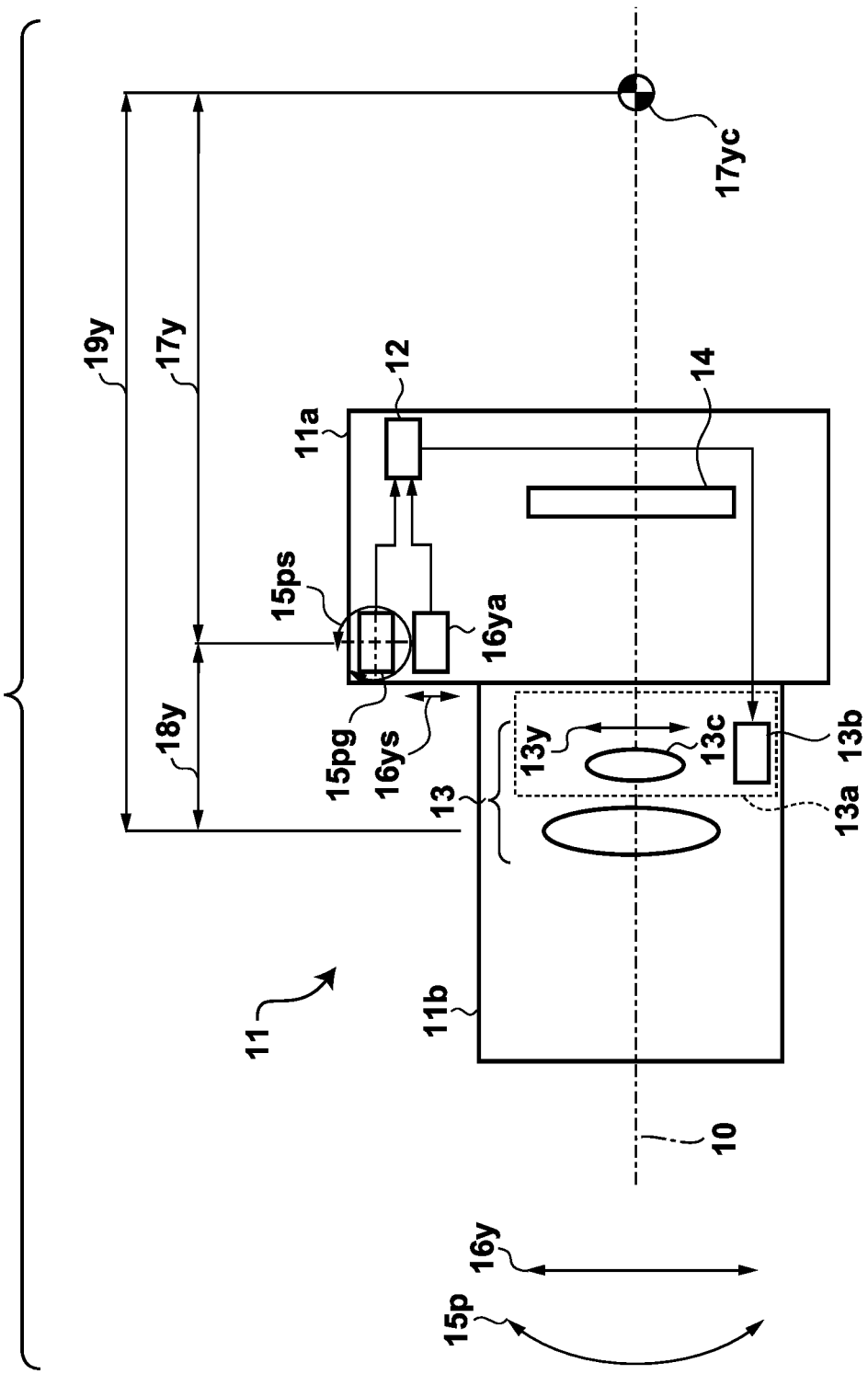
FIG. 1 is a side view of a camera according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Hereinafter, the first embodiment of the present invention will be described.

Figure 2:
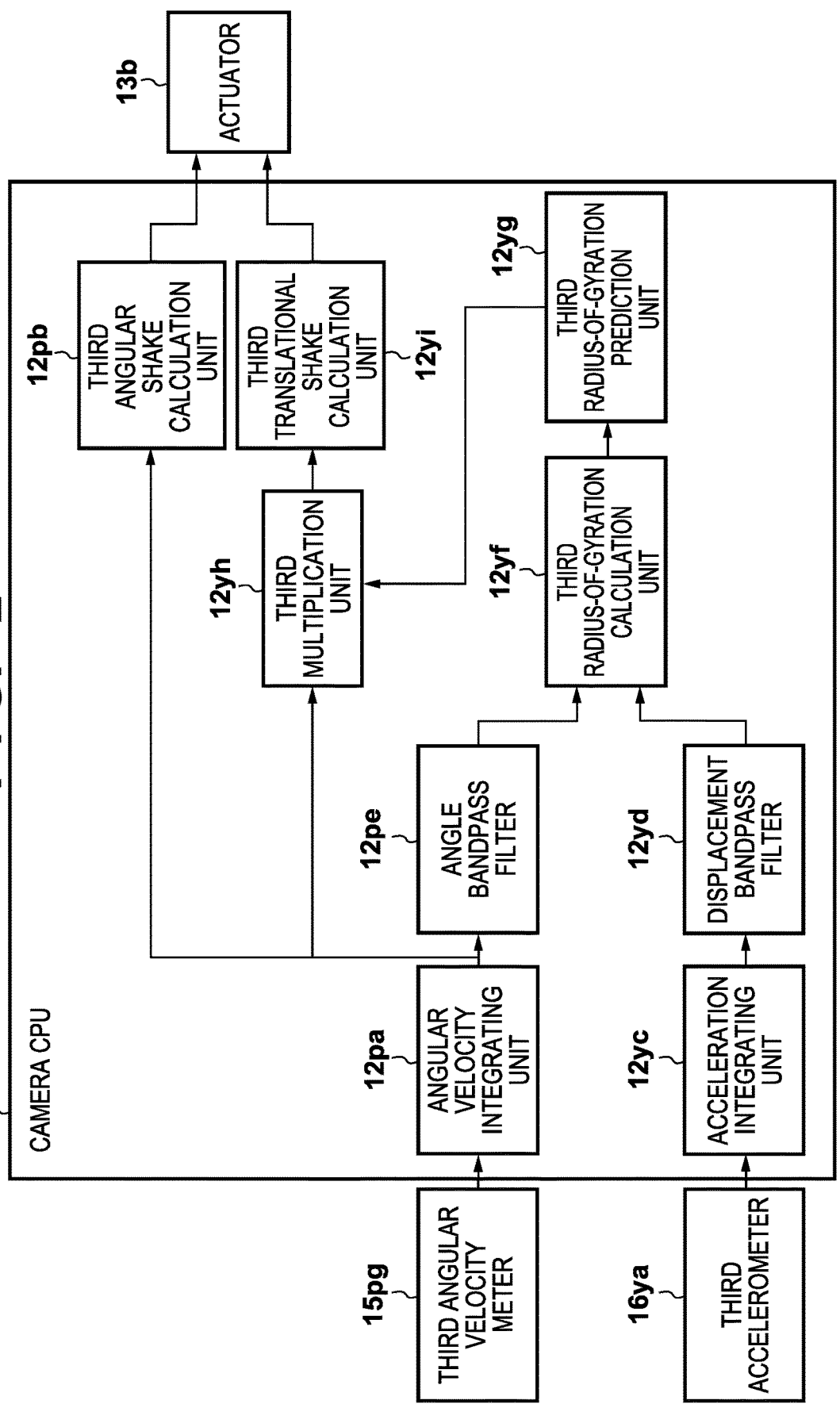
FIG. 2 is a block diagram showing a configuration for performing image stabilization control in a camera CPU shown in FIG. 1.

FIG. 1 is a side view briefly showing the functional configuration of an image stabilization control system in a camera 11 including a camera body 11a and an interchangeable lens 11b that can be attached to and detached from the camera body 11a. Further, FIG. 2 is a block diagram showing a configuration for performing image stabilization control in a camera CPU 12 shown in FIG. 1.

The camera CPU 12 provided in the camera body 11a controls the shooting operation and the image stabilization control operation in the camera 11 in response to a shooting instruction operation or the like by a photographer.

When the light flux from a subject along an optical axis 10 enters an image sensor 14 through an imaging optical system 13 provided in the interchangeable lens 11b, the image sensor 14 photoelectrically converts the incident light flux and outputs an image signal.

In FIG. 1, a third angular velocity meter 15pg detects the angular velocity of a rotational shake applied to the camera 11 in the direction (fifth direction) indicated by an arrow 15ps and outputs an angular velocity signal. The angular velocity signal from the third angular velocity meter 15pg is input to the camera CPU 12. Further, a third accelerometer 16ya detects the acceleration of a translational shake applied to the camera 11 in the direction (fourth direction) indicated by an arrow 16ys and outputs an acceleration signal. The acceleration signal from the third accelerometer 16ya is input to the camera CPU 12.

The angular velocity signal from the third angular velocity meter 15pg is integrated by an angular velocity integrating unit 12pa shown in FIG. 2 and converted into an angular velocity signal in the direction indicated by an arrow 15p (fifth direction). The angular signal from the angular velocity integrating unit 12pa is input to a third angular shake calculation unit 12pb, an angle bandpass filter 12pe, and a third multiplication unit 12yh.

The third angular shake calculation unit 12pb applies a gain to the input angular signal according to the characteristics of the imaging lens and the focal length, and outputs an obtained third angular shake reduction target value to an actuator 13b. Then, the actuator 13b actuates an image stabilizing lens 13c, which is a part of the imaging optical system 13, in the direction of an arrow 13y based on the third angular shake reduction target value to reduce the angular shake. The image stabilizing lens 13c and the actuator 13b constitute an image stabilization unit 13a.

On the other hand, the acceleration signal from the third accelerometer 16ya is second-order integrated by an acceleration integrating unit 12yc and converted into a displacement signal, and then only a component having a desired frequency (for example, 1 Hz) is extracted from the displacement signal by a displacement bandpass filter 12yd. Further, from the angle signal from the angular velocity integrating unit 12pa, only the component having a desired frequency (for example, 1 Hz) is extracted by the angle bandpass filter 12pe.

A third radius-of-gyration calculation unit 12yf calculates a radius of gyration 17y from a rotation center 17yc of the shake to the third accelerometer 16ya from the ratio of the displacement signal and the angle signal of the same frequency extracted by the displacement bandpass filter 12yd and the angle bandpass filter 12pe, respectively. Further, a preset radius of gyration 18y from the third accelerometer 16ya to the principal point of the optical system is added to the obtained radius of gyration 17y to obtain a third radius of gyration 19y.

The third radius of gyration 19y is input to the third multiplication unit 12yh via a third radius-of-gyration prediction unit 12yg that predicts a radius of gyration when the radius of gyration is not obtained. The third multiplication unit 12yh recalculates the translational shake in the direction of an arrow 16y (fourth direction) by finding a product of the third radius of gyration 19y and the angle signal input from the angular velocity integrating unit 12pa.

In this way, once the third radius of gyration 19y is found, the translational shake in the direction of the arrow 16y can be stably detected by using only the angular velocity signal from the third angular velocity meter 15pg without using the acceleration signal from the third accelerometer 16ya.

A translational shake signal from the third multiplication unit 12yh is input to a third translational shake calculation unit 12yi, undergoes gain adjustment according to the characteristics of the imaging lens and the imaging magnification, and an obtained third translational shake reduction target value is input to the actuator 13b. By actuating the image stabilizing lens 13c in the direction of the arrow 13y by the actuator 13b based on the third translational shake reduction target value, translational image stabilization is performed in addition to the above-mentioned angular shake image stabilization.

Figure 3:
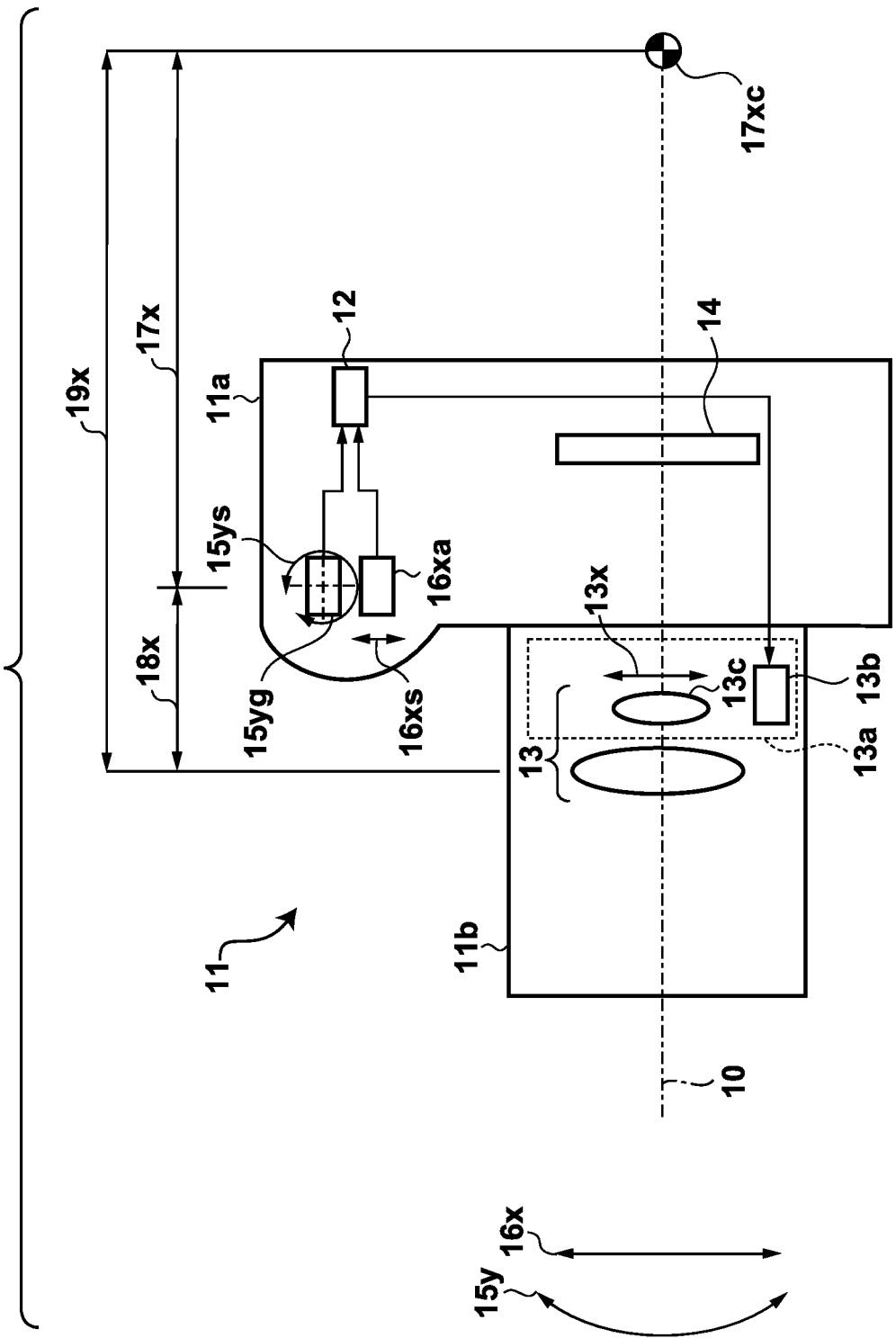
FIG. 3 is a top view of the camera according to the first embodiment.
Figure 4:
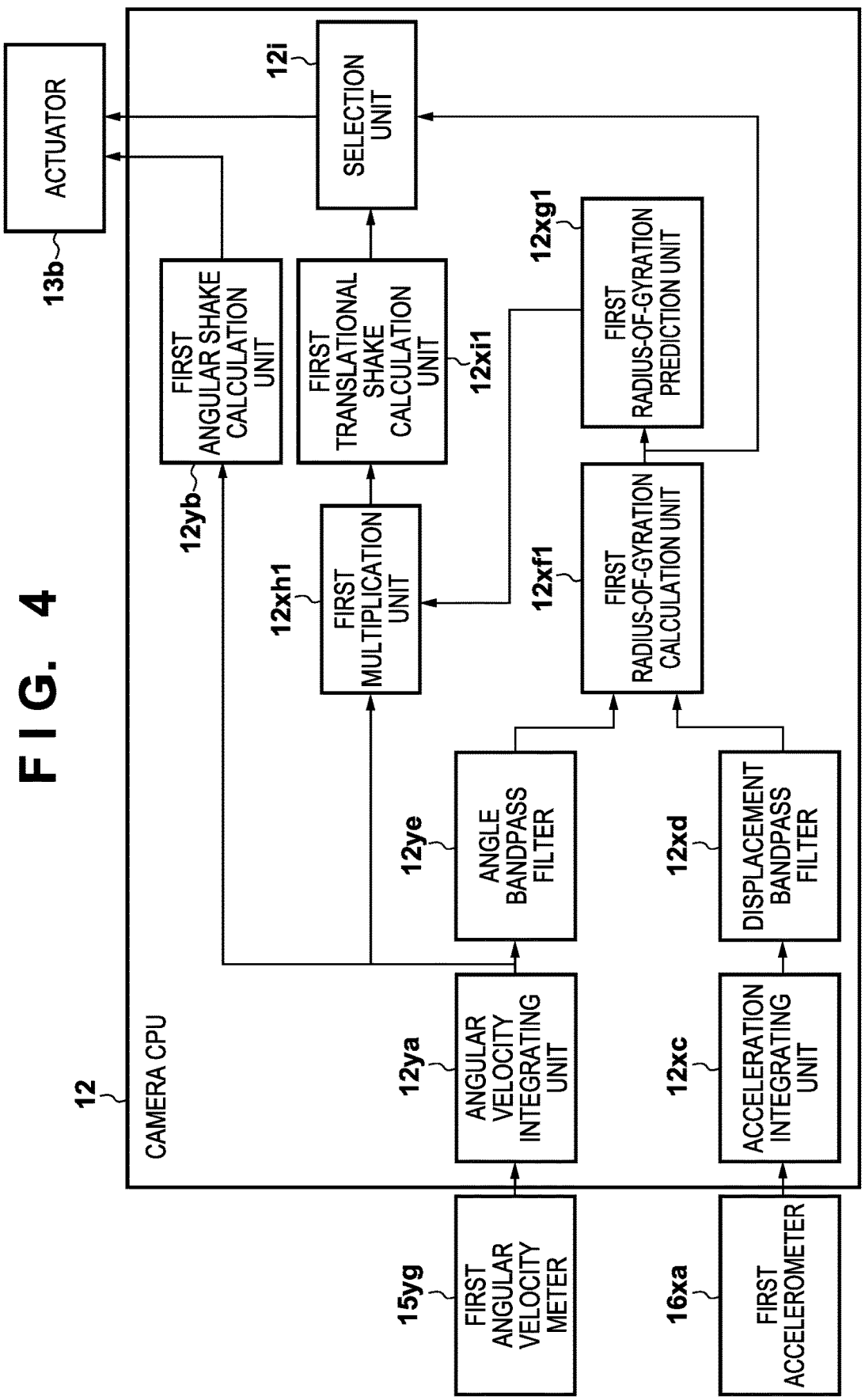
FIG. 4 is a block diagram showing a configuration for performing image stabilization control in the camera CPU shown in FIG. 3.

FIG. 3 is a top view of the camera 11, and FIG. 4 is a block diagram showing a configuration for performing image stabilization control in the camera CPU 12 shown in FIG. 3.

In FIG. 3, a first angular velocity meter 15yg detects the angular velocity of rotational shake applied to the camera 11 in the direction (second direction) indicated by an arrow 15ys and outputs an angular velocity signal. The angular velocity signal from the first angular velocity meter 15yg is input to the camera CPU 12. Further, a first accelerometer 16xa detects the acceleration of translational shake applied to the camera 11 in the direction (first direction) indicated by an arrow 16xs and outputs an acceleration signal. The acceleration signal from the first accelerometer 16xa is input to the camera CPU 12.

The angular velocity signal from the first angular velocity meter 15yg is integrated by an angular velocity integrating unit 12ya shown in FIG. 4 to be converted into an angle signal in the direction indicated by an arrow 15y (second direction). The angle signal from the angular velocity integrating unit 12ya is input to a first angular shake calculation unit 12yb, an angle bandpass filter 12ye, and a first multiplication unit 12xh1.

The first angular shake calculation unit 12*yb* applies a gain to the input angle signal according to the characteristics of the imaging lens and the focal length, and outputs an obtained first angular shake reduction target value to the actuator 13*b*. Then, the actuator 13*b* reduces the angular shake by actuating the image stabilizing lens 13*c* in the direction of an arrow 13*x* based on the first angular shake reduction target value.

On the other hand, the acceleration signal from the first accelerometer 16*xa* is second-order integrated by an acceleration integrating unit 12*xc* and converted into a displacement signal, and then only a component having a desired frequency (for example, 1 Hz) is extracted by a displacement bandpass filter 12*xd*. Further, from an angle signal from the angular velocity integrating unit 12*ya*, only the component having a desired frequency (for example, 1 Hz) is extracted by the angle bandpass filter 12*ye*.

A first radius-of-gyration calculation unit 12*xf*1 calculates a radius of gyration 17*x* from a rotation center 17*xc* of the shake to the first accelerometer 16*xa* from the ratio of the displacement signal and the angle signal of the same frequency extracted by the displacement bandpass filter 12*xd* and the angle bandpass filter 12*ye*, respectively. Further, a preset radius of gyration 18*x* from the first accelerometer 16*xa* to the principal point of the optical system is added to the obtained radius of gyration 17*x* to obtain a first radius of gyration 19*x*.

The first radius of gyration 19*x* is input to the first multiplication unit 12*xh*1 via a first radius-of-gyration prediction unit 12*xg*1 that predicts a radius of gyration when a radius of gyration is not obtained, and is also input to a selection unit 12*i*. The first multiplication unit 12*xh*1 recalculates the translational shake in the direction of an arrow 16*x* (first direction) by finding a product of the input first radius of gyration 19*x* and the angle signal input from the angular velocity integrating unit 12*ya*.

In this way, once the first radius of gyration 19*x* is found, the translational shake in the direction of the arrow 16*x* can be stably detected by using only the angular velocity signal from the first angular velocity meter 15*yg* without using the acceleration signal from the first accelerometer 16*xa*.

A translational shake signal from the first multiplication unit 12*xh*1 is input to a first translational shake calculation unit 12*xi*1, undergoes gain adjustment according to the characteristics of the imaging lens and the magnification, and an obtained first translational shake reduction target value is input to the selection unit 12*i* described later. The processing in the selection unit 12*i* will be described in detail later. The signal output from the selection unit 12*i* is input to the actuator 13*b*, and by actuating the image stabilizing lens 13*c* in the direction of the arrow 13*x* based on the signal by the actuator 13*b*, translational shake is reduced in addition to the above-mentioned angular shake.

Figure 5:
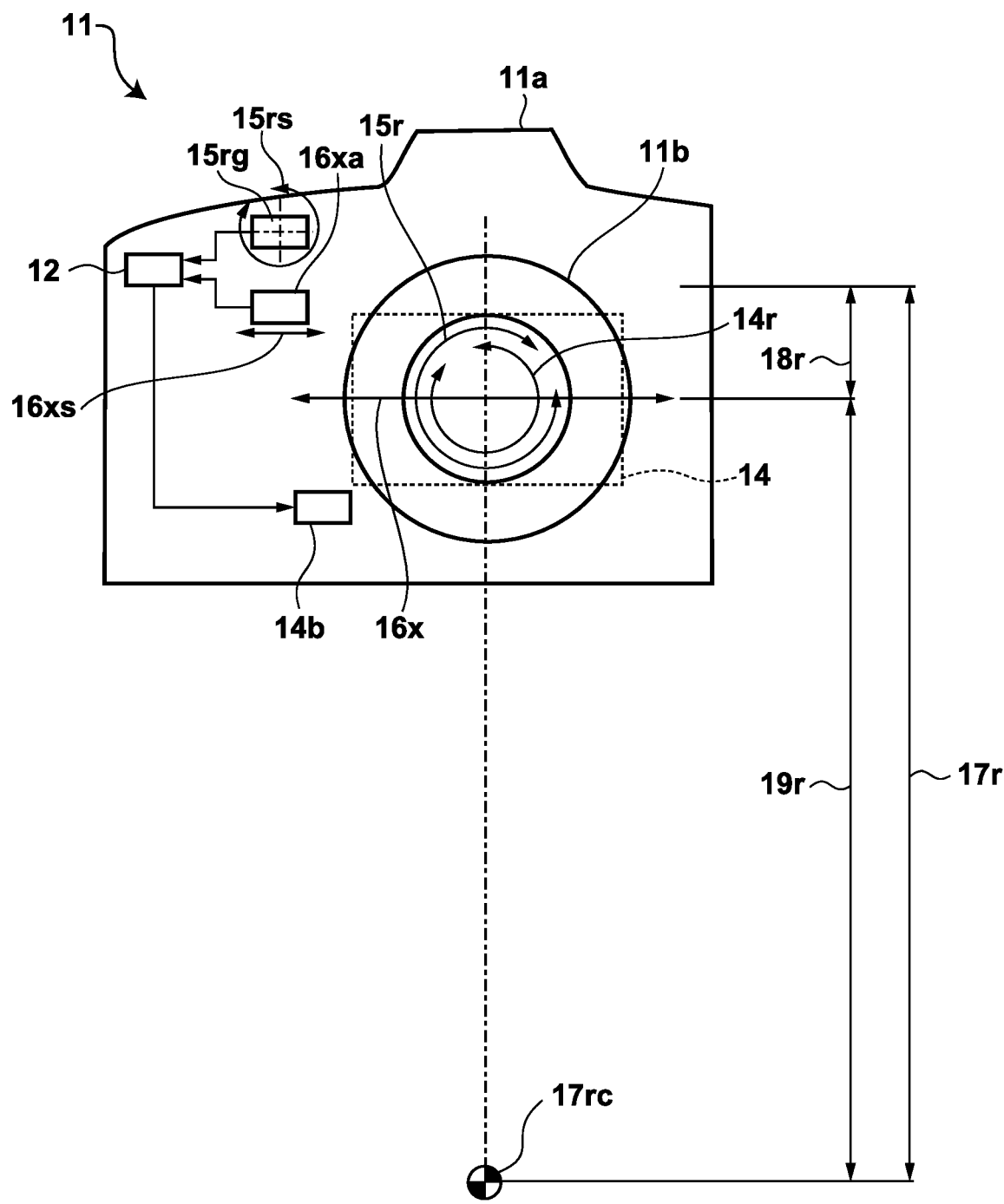
FIG. 5 is a front view of the camera according to the first embodiment.
Figure 6:
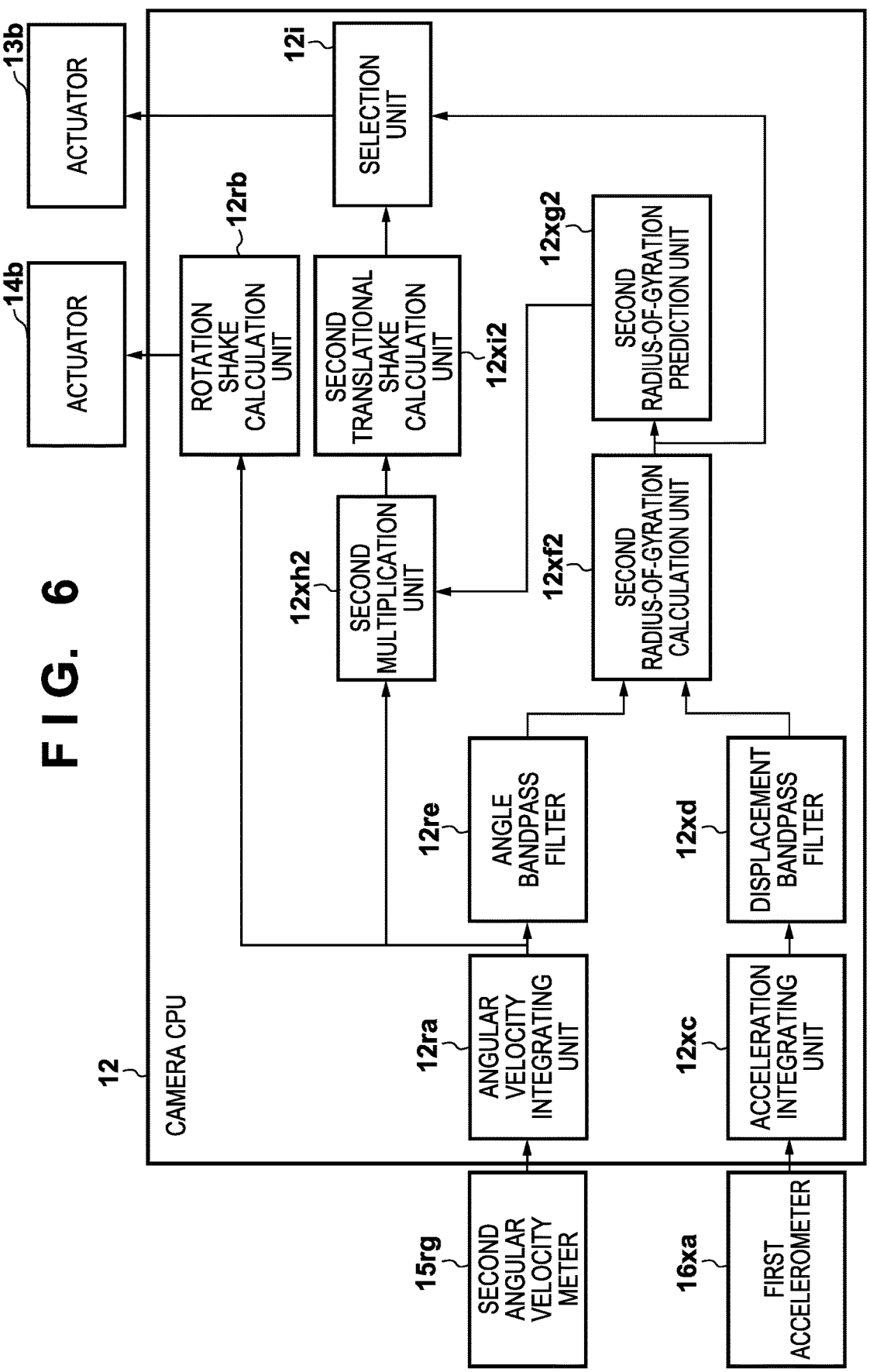
FIG. 6 is a block diagram showing a configuration for performing image stabilization control in the camera CPU shown in FIG. 5.

FIG. 5 is a front view of the camera 11, and FIG. 6 is a block diagram showing a configuration for performing image stabilization control in the camera CPU 12 of FIG. 5.

In FIG. 5, a second angular velocity meter 15*rg* detects the angular velocity of the rotational shake applied to the camera 11 in the direction (third direction) indicated by an arrow 15*rs* and outputs an angular velocity signal. The angular velocity signal from the second angular velocity meter 15*rg* is input to the camera CPU 12. The first accelerometer 16*xa* is the same as that shown in FIG. 3.

The angular velocity signal from the second angular velocity meter 15*rg* is integrated by an angular velocity integrating unit 12*ra* shown in FIG. 6 to be converted into an angle signal around the imaging optical axis (third direction) indicated by an arrow 15*r*. The angle signal from the angular velocity integrating unit 12*ra* is input to a rotation shake calculation unit 12*rb*, an angle bandpass filter 12*re*, and a second multiplication unit 12*xh*2.

The rotation shake calculation unit 12*rb* applies a gain to the input angle signal according to the characteristics of the imaging lens and the focal length, and outputs an obtained rotational shake reduction target value to an actuator 14*b*. Then, the actuator 14*b* actuates the image sensor 14 in the direction of an arrow 14*r* based on the rotational shake reduction target value to reduce the rotation shake. The image sensor 14 and the actuator 14*b* form an image stabilization unit.

On the other hand, as described in FIG. 4, the acceleration signal from the first accelerometer 16*xa* is second-order integrated by the acceleration integrating unit 12*xc* and converted into a displacement signal, and then only the desired frequency component (for example, 1 Hz) is extracted by the displacement bandpass filter 12*xd*. Further, from the angular signal from the angular velocity integrating unit 12*ra*, only the component having a desired frequency (for example, 1 Hz) is extracted by the angle bandpass filter 12*re*.

A second radius-of-gyration calculation unit 12*xf*2 calculates a radius of gyration 17*r* from a rotation center 17*rc* of the shake to the first accelerometer 16*xa* from the ratio of the displacement signal and the angle signal of the same frequency extracted by the displacement bandpass filter 12*xd* and the angle bandpass filter 12*re*, respectively. Further, a preset radius of gyration 18*r* from the first accelerometer 16*xa* to the imaging optical axis is added to the obtained radius of gyration 17*r* to obtain a second radius of gyration 19*r*.

The second radius of gyration 19*r* is input to the second multiplication unit 12*xh*2 via a second radius-of-gyration prediction unit 12*xg*2 that predicts a radius of gyration when a radius of gyration is not obtained, and is also input to the selection unit 12*i*. The second multiplication unit 12*xh*2 recalculates the translational shake in the direction of the arrow 16*x* (first direction) by finding a product of the input second radius of gyration 19*r* and the angle signal input from the angular velocity integrating unit 12*ra*.

In this way, once the second radius of gyration 19*r* is found, the translational shake in the direction of the arrow 16*x* can be stably detected by using only the angular velocity signal from the second angular velocity meter 15*rg* without using the acceleration signal from the first accelerometer 16*xa*.

The translational shake signal from the second multiplication unit 12*xh*2 is input to a second translational shake calculation unit 12*xi*2 and undergoes gain adjustment according to the characteristics of the photographing lens and the magnification, and then an obtained second translational shake reduction target value is input to the selection unit 12*i* described later. The processing in the selection unit 12*i* will be described in detail later.

Figure 7:
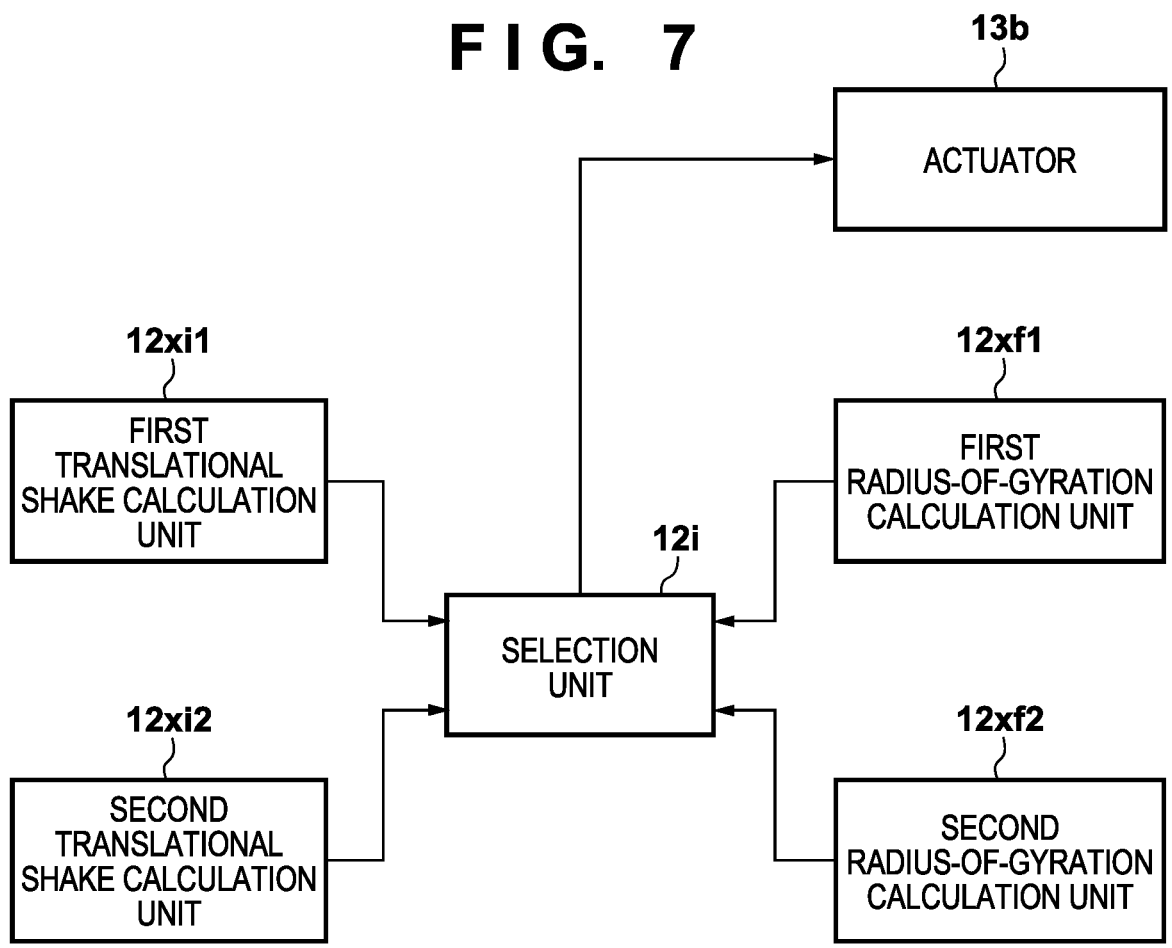
FIG. 7 is a block diagram showing a configuration of a selection unit according to the first embodiment.

Next, the configuration and processing of the selection unit 12*i* shown in FIGS. 4 and 6 will be described with reference to FIG. 7.

The first radius of gyration 19*x* calculated by the first radius-of-gyration calculation unit 12*xf*1 shown in FIG. 4 and the second radius of gyration 19*r* calculated by the second radius-of-gyration calculation unit 12*xf*2 shown in FIG. 6 are input to the selection unit 12*i*. Then, a translational shake reduction target value calculated based on the longer radius of gyration of the first translational shake reduction target value output from the first translational shake calculation unit 12xi1 and the second translational shake reduction target value output from the second translational shake calculation unit 12xi2 is output to the actuator 13b. For example, if the first radius of gyration 19x, which was the basis for calculating the first translational shake reduction target value in the first translational shake calculation unit 12xi1 is longer than the second radius of gyration 19r, which was the basis for calculating the second translational shake reduction target value in the second translational shake calculation unit 12xi2, the first translational shake reduction target value is output to the actuator 13b.

As described with reference to FIGS. 3 to 6, the translational shake reduction target value in the direction of the arrow 16x (first direction) includes two types of values, one of which is calculated from the angle signal in the direction of the arrow 15y (second direction) and the first radius of gyration 19x and the other of which is calculated from the rotation shake in the direction of the arrow 15r (third direction) and the second radius of gyration 19r. In this embodiment, the one that has a large effect on image deterioration is selected to reduce the translational shake in the direction of the arrow 16x. The first radius of gyration 19x and the second radius of gyration 19r are used as the criteria for selecting the one of the values that has a greater effect on image deterioration.

It is explained in this embodiment that the first accelerometer 16xa and the third accelerometer 16ya are used to detect translational shake, but a motion vector in each direction obtained from the images from the image sensor 14 may be used for translational shake detection. Also, it is explained that in order to reduce the angular shake in the direction of the arrow 15p, the angular shake in the direction of the arrow 15y, the translational shake in the direction of the arrow 16x, and the translational shake in the direction of the arrow 16y, the image stabilizing lens 13c is moved in the directions of the arrows 13y and 13x, however, the present invention is not limited to this. For example, the actuator 14b may be used to move the image sensor 14 in the directions of the arrows 13y and 13x, or both of the image stabilizing lens 13c and the image sensor 14 may be moved.

Figure 8:
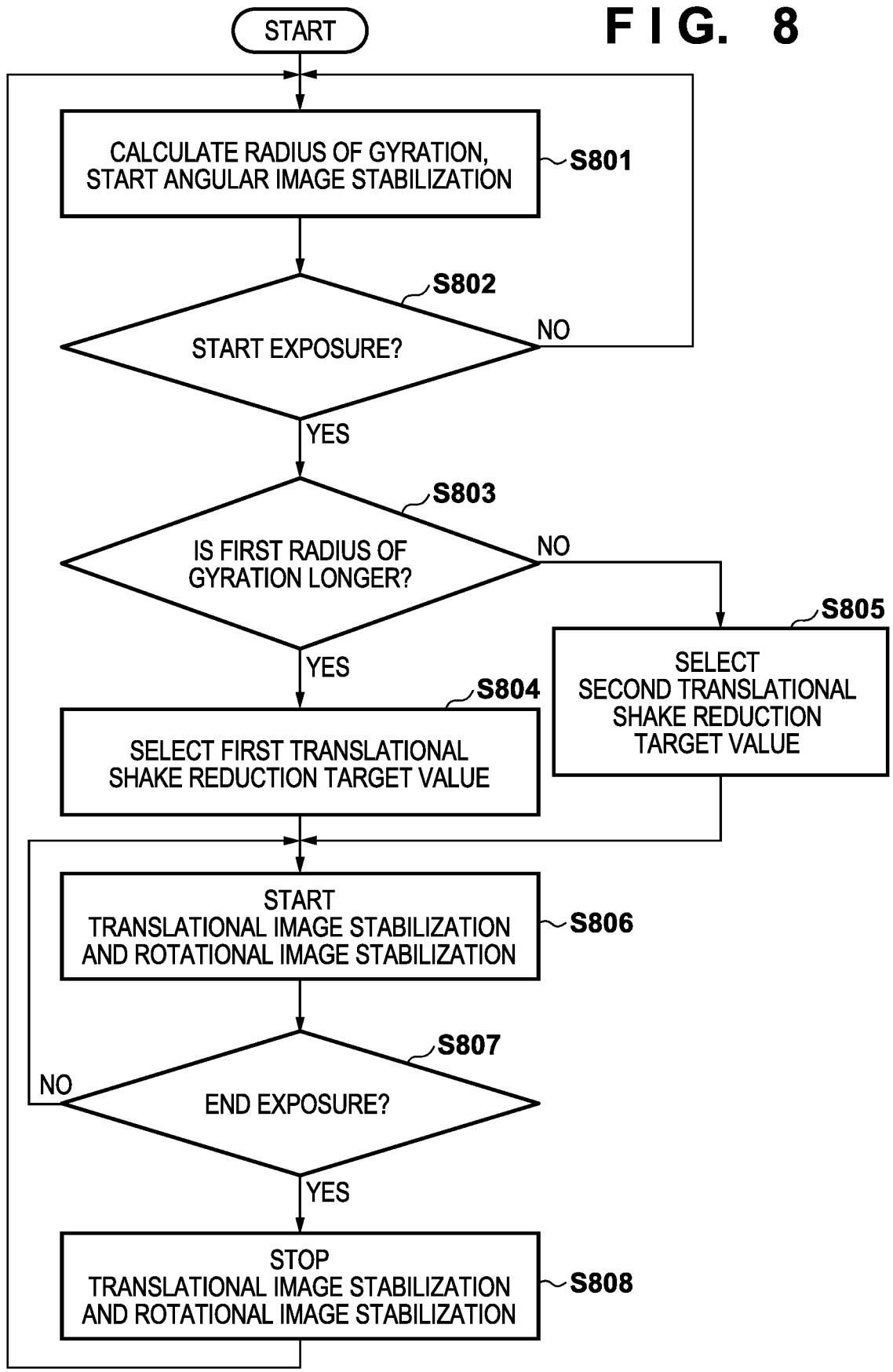
FIG. 8 is a flowchart showing image stabilization processing according to the first embodiment.

FIG. 8 is a flowchart showing the image stabilization processing in the present embodiment, and this processing starts when the power of the camera 11 is turned on.

In step S801, the first radius-of-gyration calculation unit 12xf1, the second radius-of-gyration calculation unit 12xf2, and the third radius-of-gyration calculation unit 12yf calculate the first radius of gyration 19x, the second radius of gyration 19r, and the third radius of gyration 19y, respectively. Further, angular image stabilization is started.

Until it is determined in step S802 that the exposure is started, the steps S801 and S802 are repeated to wait, and when the exposure is started, the process proceeds to step S803.

In step S803, the selection unit 12i compares the first radius of gyration 19x with the second radius of gyration 19r. If the first radius of gyration 19x is longer, the process proceeds to step S804, otherwise the process proceeds to step S805.

In step S804, the selection unit 12i selects the first translational shake reduction target value obtained from the first translational shake calculation unit 12xi1. On the other hand, in step S805, the selection unit 12i selects the second translational shake reduction target value obtained from the second translational shake calculation unit 12xi2.

As can be seen from FIG. 2, the third radius of gyration 19y output from the third translational shake calculation unit 12y is always used because it does not go through the selection unit 12i.

In step S806, in addition to the angular image stabilization, the translational image stabilization and the rotational image stabilization are started. Then, steps S806 and S807 are repeated until it is determined in step S807 that the exposure is completed, and when it is determined that the exposure is completed, the process proceeds to step S808.

In step S808, the translational image stabilization and the rotational image stabilization are stopped, and the process returns to step S801.

As described above, according to the first embodiment, the translational shake reduction target values are calculated by a plurality of methods, and the translational shake reduction target value having the greater influence on the image deterioration is selected, thereby high-precision translational image stabilization can be realized with a simple configuration.

In the first embodiment, it is explained the case where the first and second translational shake reduction target values in the direction of the arrow 16x (first direction) are found from the acceleration signal from the first accelerometer 16xa, the angular velocity signal from the first angular velocity meter 15yg, and the angular velocity signal from the second angular velocity meter 15rg, and one of them is selected. However, the present invention is not limited to this, and two types of translational shake reduction target values in the direction of the arrow 16y (fourth direction) may be found and either of them may be selected.

In that case, the acceleration signal from the third accelerometer 16ya is used instead of the acceleration signal from the first accelerometer 16xa, and the angular velocity signal from the third angular velocity meter 15pg is used instead of the angular velocity signal from the first angular velocity meter 15yg, and a selection unit for selecting the translational shake reduction target value in the direction of the arrow 16y is provided, and the same processing as in the case for the direction of the arrow 16x may be performed.

Further, it may be configured to find the translational shake reduction target value in either the direction of the arrow 16x or the direction of the arrow 16y, or it may be configured to obtain the translational shake reduction target values in both directions.

Further, in the first embodiment, the first radius of gyration 19x, the first translational shake reduction target value, the second translational shake reduction target value, and the second radius of gyration 19r are all input to the selection unit 12i. However, the present invention is not limited to this. For example, the first radius of gyration 19x and the second radius of gyration 19r may be input to the selection unit 12i, and after either the first radius of gyration 19x or the second radius of gyration 19r is selected, the translational shake reduction target value corresponding to the selected radius of gyration may be calculated. In this case, if the first radius of gyration 19x is selected, the second translational shake reduction target value is not calculated. In this way, the selection unit 12i may select the shake reduction target value by selecting the calculation unit for calculating the shake reduction target value.

Second Embodiment

Next, a second embodiment of the present invention will be described. Since the configuration of the camera 11 including the image stabilization control system in the second embodiment is basically the same as that described with reference to FIGS. 1 to 6 in the first embodiment, the description thereof will be omitted. However, in the second embodiment, the first radius of gyration 19*x* output from the first radius-of-gyration calculation unit 12*xf*1 and the second radius of gyration 19*r* output from the second radius-of-gyration calculation unit 12*xf*2 are not input to the selection unit 12*i* different from the configuration shown in FIGS. 4 and 6.

Figure 9:
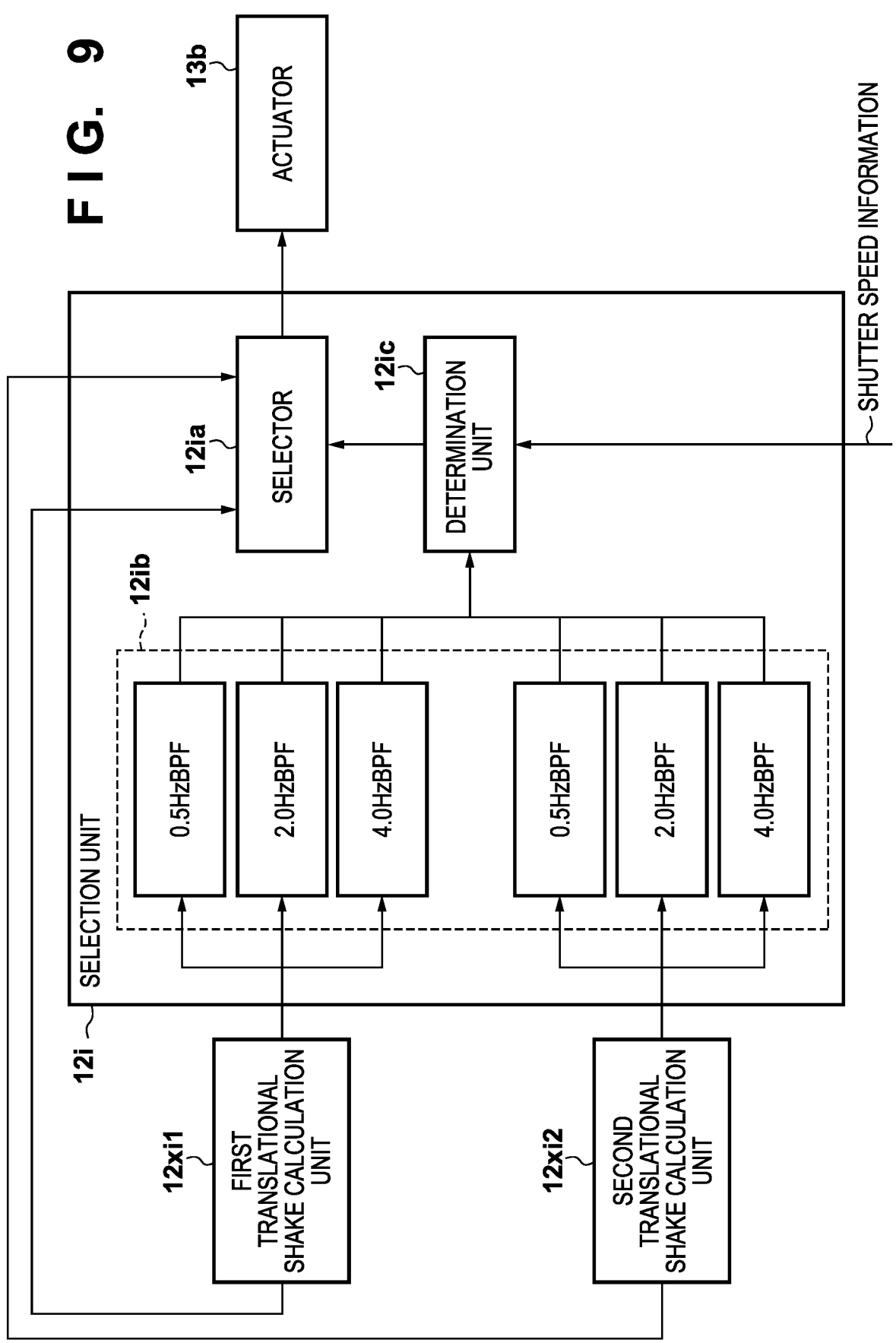
FIG. 9 is a block diagram showing a configuration of a selection unit according to a second embodiment.

FIG. 9 shows the configuration of the selection unit 12*i* in the second embodiment. To the selection unit 12*i*, the first translational shake reduction target value output from the first translational shake calculation unit 12*xi*1 shown in FIG. 4 and the second translational shake reduction target value output from the second translational shake calculation unit 12*xi*2 shown in FIG. 6 are input. The first translational shake reduction target value and the second translational shake reduction target value are input to a selector 12*ia*, and at the same time, signals of, for example, 0.5 Hz, 2.0 Hz, and 4.0 Hz are extracted from these values by the bandpass filters (BPFs) 12*ib*, respectively, and the effective values of the extracted signals are input to a determination unit 12*ic*.

Further, the shutter speed information acquired by the camera CPU 12 is also input to the determination unit 12*ic*. The selector 12*ia* selects the first translational shake reduction target value or the second translational shake reduction target value based on the output of the determination unit 12*ic* obtained by using the plurality of input information, and outputs the selected translational shake reduction target value to the actuator 13*b*.

Here, the criteria of determination in the determination unit 12*ic* will be described. As described above, shutter speed information is input to the determination unit 12*ic*. The magnitude of image deterioration due to camera shake changes depending on the shutter speed Tv. For example, when the shutter speed Tv is long (slow) and longer than ½ second, image deterioration due to low frequency shake is conspicuous. On the contrary, when the shutter speed Tv is short (fast) and shorter than ⅓₀ second, image deterioration due to high frequency shake is conspicuous. Therefore, the determination unit 12*ic* determines a frequency that has a greater effect on image deterioration based on the shutter speed Tv, and selects the translational shake reduction target value from the output magnitude of the bandpass filter at that frequency.

Specifically, for example, when the shutter speed Tv is ⅛ second, the output of the 2.0 Hz bandpass filter is considered important, and the 2.0 Hz signal extracted from the first translational shake reduction target value is compared with the 2.0 Hz signal extracted from the second translational shake reduction target value. Then, which of the effective values is larger is output to the selector 12*ia*.

Figure 10:
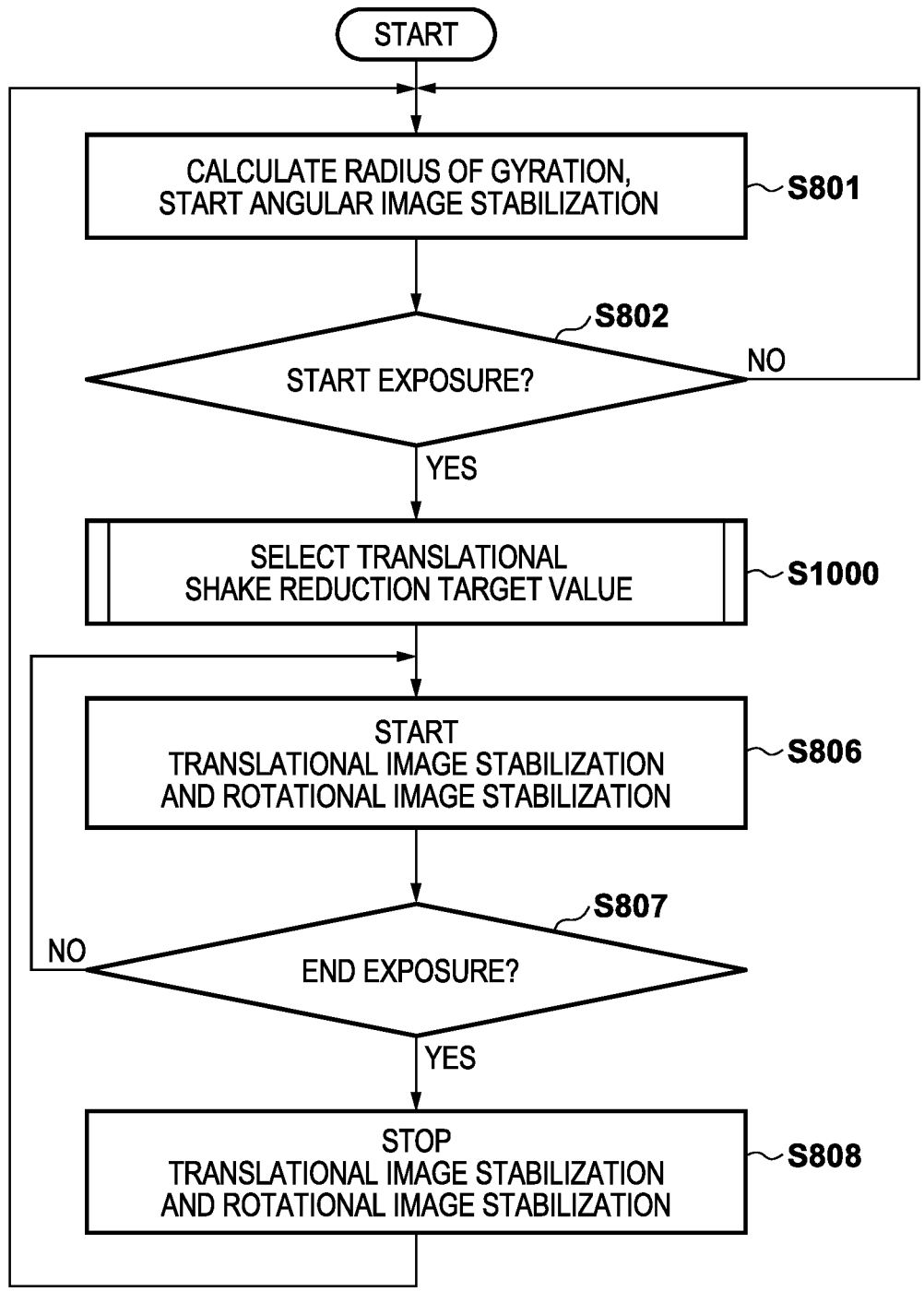
FIG. 10 is a flowchart showing image stabilization processing according to the second embodiment.
Figure 11:
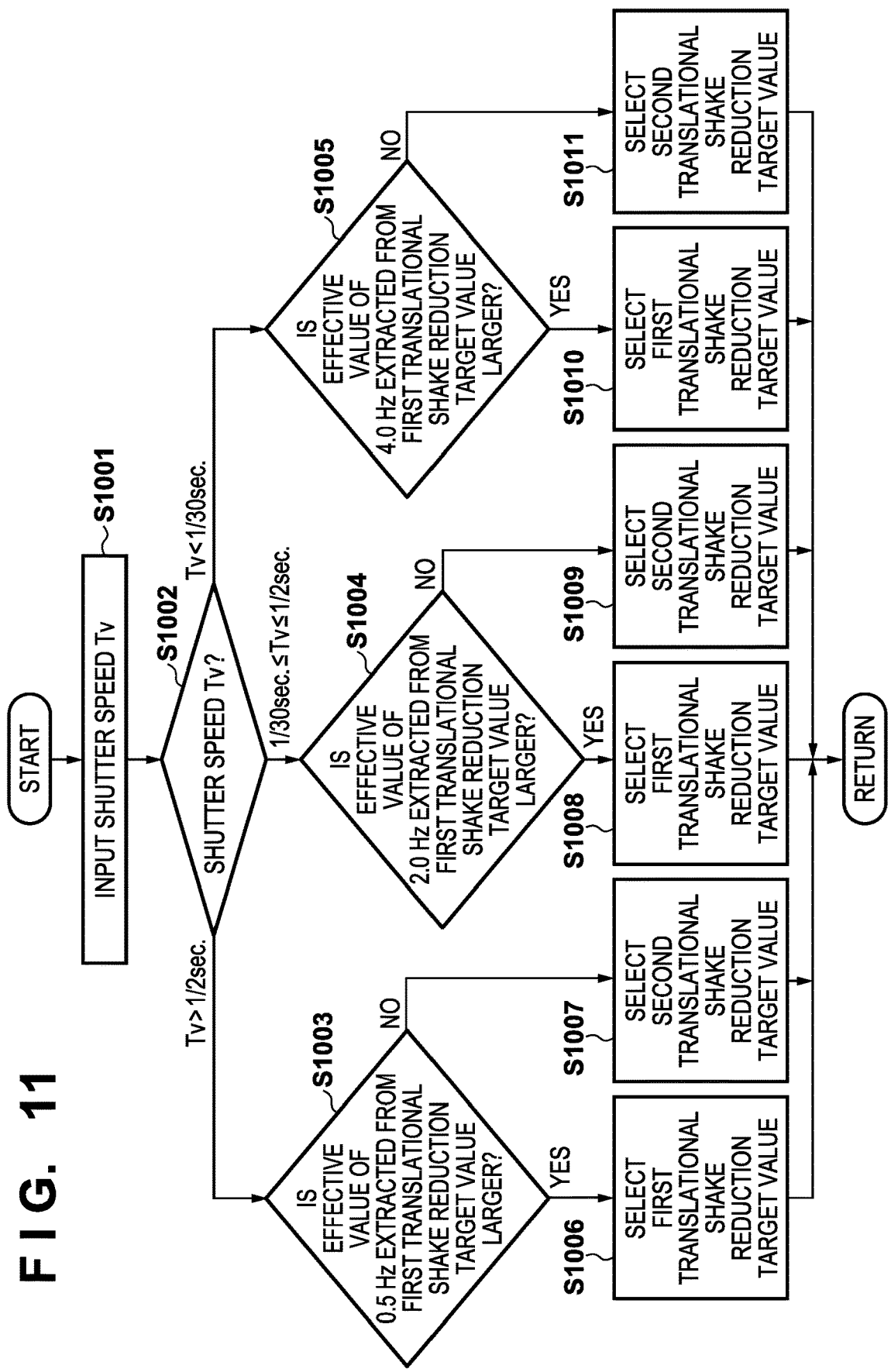
FIG. 11 is a flowchart showing translational shake reduction target value selection processing according to the second embodiment.

FIG. 10 is a flowchart showing an image stabilization processing according to the second embodiment, and this processing starts when the power of the camera 11 is turned on. The difference from the processing shown in FIG. 8 is that the selection processing of the translational shake reduction target value shown in FIG. 11 is performed in step S1000 instead of the selection processing of the translational shake reduction target value performed in steps S803 to S805. Other than this, the processes are the same as those shown in FIG. 8, so the same step numbers are assigned and the description thereof will be omitted.

FIG. 11 is a flowchart showing the selection processing of the translational shake reduction target value in the determination unit 12*ic*.

In step S1001, the shutter speed Tv is input. In step S1002, the shutter speed Tv is determined, and if it is longer than ½ second, the process proceeds to step S1003, if it is shorter than ⅓₀ second, the process proceeds to step S1005, and if it is in between, the process proceeds to step S1004.

In step S1003, the effective values of 0.5 Hz extracted from the first translational shake reduction target value and the second translational shake reduction target value are compared. Then, if the effective value of the first translational shake reduction target value is larger, the determination result for selecting the first translational shake reduction target value is output to the selector 12*ia* in step S1006. If the effective value of the first translational shake reduction target value is not larger, the determination result for selecting the second translational shake reduction target value is output to the selector 12*ia* in step S1007.

Similarly, in step S1004, the effective values of 2.0 Hz extracted from the first translational shake reduction target value and the second translational shake reduction target value are compared. Then, if the effective value of the first translational shake reduction target value is larger, the determination result for selecting the first translational shake reduction target value is output to the selector 12*ia* in step S1008. If the effective value of the first translational shake reduction target value is not larger, the determination result for selecting the second translational shake reduction target value is output to the selector 12*ia* in step S1009.

Further, in step S1005, the effective values of 4.0 Hz extracted from the first translational shake reduction target value and the second translational shake reduction target value are compared. Then, if the effective value of the first translational shake reduction target value is larger, the determination result for selecting the first translational shake reduction target value is output to the selector 12*ia* in step S1010. If the effective value of the first translational shake reduction target value is not larger, the determination result for selecting the second translational shake reduction target value is output to the selector 12*ia* in step S1011.

In the determination of steps S1003, S1004, and S1005, the first translational shake reduction target value may be selected if the effective value of the first translational shake reduction target value and the effective value of the second translational shake reduction target value are the same.

As described above, according to the second embodiment, the translational shake reduction target value is calculated by a plurality of methods, and the translational shake reduction target value, which has a greater effect on image deterioration, is selected according to the shutter speed. In this way, high-precision translational image stabilization can be achieved with a simple configuration.

Note that the second embodiment has been explained with respect to the direction of the arrow 16*x* (first direction), but the same processing may be performed for the direction of the arrow 16*y* (fourth direction).

Further, as in the first embodiment, if it is possible to select the one with the larger translational shake at a given frequency based on the angular shake (angular velocity) in the second direction and the angular shake (angular velocity) in the third direction without calculating the target correction value, the shake reduction target value may be selected by selecting the calculation unit.

Further, in the second embodiment, the effective values of the first translational shake reduction target value and the second translational shake reduction target value in a frequency band corresponding to a shutter speed are compared. However, instead of extracting and comparing the effective values in a predetermined frequency band, the first first translational shake reduction target value and the second translational shake reduction target value may be compared.

Further, in the above embodiments, the case where the image stabilization control apparatus of the present invention is mounted on the image capturing apparatus has been described, but the present invention is not limited to this, and the image stabilization control apparatus of the present invention may be mounted on any electronic device capable of detecting angular shake and translational shake.

Further, in the above embodiments, the case where two units for calculating the shake reduction target value of the translational shake in the first direction are provided has been described, but three or more means may be provided. For example, a calculation unit which calculates an shake reduction target value of the translational shake in the first direction based on the motion vector acquired based on the images taken by the image capturing apparatus without using an acceleration signal indicating the translational shake in the first direction may be further provided. The configuration may be such that in a case where the reliability of the acceleration signal is low or in a case where the reliability of the translational shake signal based on the motion vector is high, the shake reduction target value calculated by this calculation unit may be selected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-139231, filed Aug. 27, 2021 which is hereby incorporated by reference herein in its entirety.

What is claimed is:

1. An image stabilization control apparatus comprising one or more processors and/or circuitry which functions as:
    a first calculation unit that calculates a first shake reduction target value for reducing translational shake in a first direction using a first signal indicating translational shake in the first direction and a second signal indicating rotational shake about an axis in a second direction which is orthogonal to the first direction;
    a second calculation unit that calculates a second shake reduction target value for reducing the translational shake in the first direction using the first signal and a third signal indicating rotational shake about an axis in a third direction which is orthogonal to the first direction and the second direction; and
    a selection unit that selects one of a plurality of shake reduction target values, including at least the first shake reduction target value and the second shake reduction target value, for reducing the translational shake in the first direction based on the second signal and the third signal.

2. The image stabilization control apparatus according to claim 1, wherein the first calculation unit calculates a first radius of gyration using the first signal and the second signal, and calculates the first shake reduction target value based on a product of the first radius of gyration and an angle obtained from the second signal, and
    wherein the second calculation unit calculates a second radius of gyration using the first signal and the third signal, and calculates the second shake reduction target value based on a product of the second radius of gyration and an angle obtained from the third signal.

3. The image stabilization control apparatus according to claim 2, wherein the selection unit selects the first shake reduction target value if the first radius of gyration is longer than the second radius of gyration, and selects the second shake reduction target value if the first radius of gyration is not longer than the second A radius of gyration.

4. The image stabilization control apparatus according to claim 1, wherein the selection unit selects either one of the first shake reduction target value and the second shake reduction target value in accordance with the first shake reduction target value which is based on the second signal and the second shake reduction target value which is based on the third signal.

5. The image stabilization control apparatus according to claim 4, wherein the selection unit selects a larger one of the first shake reduction target value and the second shake reduction target value.

6. The image stabilization control apparatus according to claim 1, wherein the selection unit selects either the first shake reduction target value or the second shake reduction target value in accordance with shutter speed information and magnitudes of frequency components at a plurality of frequencies extracted from each of the first shake reduction target value and the second shake reduction target value.

7. The image stabilization control apparatus according to claim 6, wherein the selection unit determines a frequency of shake that has a large effect on image deterioration in accordance with the shutter speed information, and selects either the first shake reduction target value or the second shake reduction target value whose frequency component at the determined frequency has a larger magnitude.

8. The image stabilization control apparatus according to claim 1 wherein one or more processors and/or circuitry further functions as an image stabilization control unit that controls correction of the translational shake based on the shake reduction target value selected by the selection unit from the first shake reduction target value and the second shake reduction target value.

9. The image stabilization control apparatus according to claim 1 wherein one or more processors and/or circuitry further functions as:
   a third calculation unit that calculates a third shake reduction target value for reducing the translational shake in a fourth direction using a fourth signal indicating translational shake in the fourth direction and a fifth signal indicating rotational shake about an axis in a fifth direction;
   a fourth calculation unit that calculates a fourth shake reduction target value for reducing translational shake in the fourth direction using the third signal and the fourth signal; and
   a second selection unit that selects one of a plurality of shake reduction target values, including at least the third shake reduction target value and the fourth shake reduction target value, for reducing the translational shake in the fourth direction based on the third signal and the fifth signal.

10. The image stabilization control apparatus according to claim 9 wherein one or more processors and/or circuitry further functions as an image stabilization control unit that controls correction of the translational shake based on the shake reduction target value selected by the selection unit from the first shake reduction target value and the second shake reduction target value, and controls correction of the translational shake based on the shake reduction target value selected by the second selection unit from the third shake reduction target value and the fourth shake reduction target value.

11. The image stabilization control apparatus according to claim 9, further comprising:
   an image sensor that photoelectrically converts light entering through an imaging optical system; and
   an actuator that actuates at least one of an image stabilizing lens included in the imaging optical system and the image sensor;
   wherein the processors and/or circuitry further functions as an image stabilization control unit that controls correction of translational shake by controlling the actuator based on the shake reduction target value selected by the selection unit and controls correction of translational shake by controlling the actuator based on the shake reduction target value selected by the second selection unit.

12. The image stabilization control apparatus according to claim 1, wherein the selection unit selects the shake reduction target value by selecting one of the first calculation unit and the second calculation unit that calculates the shake reduction target.

13. The image stabilization control apparatus according to claim 1, further comprising:
   an image sensor that photoelectrically converts light entering through an imaging optical system; and
   an actuator that actuates at least one of an image stabilizing lens included in the imaging optical system and the image sensor;
   wherein the processors and/or circuitry further functions as an image stabilization control unit that controls correction of translational shake by controlling the actuator based on the shake reduction target value selected by the selection unit.

14. The image stabilization control apparatus according to claim 1, further comprising:
   an imaging optical system including an image stabilizing lens; and
   an actuator that actuates the image stabilizing lens,
   wherein the processors and/or circuitry further functions as an image stabilization control unit that controls correction of translational shake by controlling the actuator based on the shake reduction target value selected by the selection unit.

15. An image stabilization control method comprising:
   calculating a first shake reduction target value for reducing translational shake in a first direction using a first signal indicating translational shake in the first direction and a second signal indicating rotational shake about an axis in a second direction which is orthogonal to the first direction;
   calculating a second shake reduction target value for reducing the translational shake in the first direction using the first signal and a third signal indicating rotational shake about an axis in a third direction which is orthogonal to the first direction and the second direction; and
   selecting one of a plurality of shake reduction target values, including at least the first shake reduction target value and the second shake reduction target value, for reducing the translational shake in the first direction based on the second signal and the third signal.

16. A non-transitory computer-readable storage medium, the storage medium storing a program that is executable by the computer, wherein the program includes program code for causing the computer to function as an image stabilization control apparatus comprising:
   a first calculation unit that calculates a first shake reduction target value for reducing translational shake in a first direction using a first signal indicating translational shake in the first direction and a second signal indicating rotational shake about an axis in a second direction which is orthogonal to the first direction;
   a second calculation unit that calculates a second shake reduction target value for reducing the translational shake in the first direction using the first signal and a third signal indicating rotational shake about an axis in a third direction which is orthogonal to the first direction and the second direction; and
   a selection unit that selects one of a plurality of shake reduction target values, including at least the first shake reduction target value and the second shake reduction target value, for reducing the translational shake in the first direction based on the second signal and the third signal.

* * * * *